Patented Jan. 24, 1939

2,144,824

UNITED STATES PATENT OFFICE 2,144,824

PROCESS OF REDUCING THE FELTING PROPERTIES OF WOOL OR OTHER FIBROUS SUBSTANCES OF ANIMAL ORIGIN

Georg Wiegand, Berlin-Grunau, Germany, assignor to the firm Chemische Fabrik Grünau, Landshoff & Meyer A. G., Berlin-Grunau, Germany, a company of Germany No Drawing. Application September 29, 1936, Serial No. 103,215. In Germany October 4, 1935

2 Claims. (Cl. 8—128)

It is known to treat wool and other fibrous substances of animal origin by exposing them to the action of the halogens, solutions of chlorine or of hypochloric acid or its salts being generally used in practice. By such treatment the fibres lose their capacity for fulling and felting and their ability to absorb dyes is increased. They also acquire an attractive silk-like sheen.

In carrying this process into effect difficulties are experienced owing to the fact that the action of the halogens, particularly that of chlorine, is too fast and is consequently uneven. The result is that the fibres are weakened, as may be seen from their reduced strength and elasticity, the deterioration of the texture of the material and its reduced resistance to stress. Moreover, further defects result from the excessive action of the chlorine, such for example as the fact that the fibrous material cannot be dyed uniformly.

The present invention eliminates or greatly reduces these defects. The invention consists in the application of the discovery that the action of the chlorine in treating baths containing chlorine or hypochlorites upon animal fibrous substances is made much slower and milder if there is added to the bath ammonia, or compounds which include one or more amino or imino groups, such for example as primary or secondary amines, amino or imino carboxylic acids, carboxylic amides, urethanes, urea, dicyandiamide, or substitution products of these compounds. The reason for this phenomenon is probably that the chlorine of the bath first reacts with the amino or imino groups, forming unstable intermediate compounds, and that in this form the chlorine has a lesser reaction energy towards the animal fibres.

To mention a few examples only, the following substances are suitable for the improved process:—ammonia, methyl amine or dimethyl amine, amino acetic acid, amino sulphonic acid, taurine, acetamide and urea. It is particularly advantageous to use those amino or imino compounds which have fibre-protective or protective-colloid properties. Such substances are present in the degradation products resulting from the hydrolytic or enzymatic degradation of protein substances. The protein degradation products consist mainly of polymeric amino carboxylic acids or polypeptides and partly also of simple amino carboxylic acids. All these compounds contain amino or imino groups.

The invention also comprises the addition to chlorine-containing treating baths for wool or other animal fibres of amino or imino compounds in which the amino or imino groups have been wholly or in part substituted by radicals which produce surface active effects. Such substitutes are, for example, higher fatty acid or fatty alcohol residues or fatty aromatic residues. Such substituted compounds are distinguished by increased wetting, frothing and dispersing capacity which they possess by virtue of their surface active properties.

It has been found that the extent of the reduction effected by the process of the invention in the harmful effects of chlorine upon animal fibres has a definite relationship to the concentration of the ammonia or of the compounds containing amino or imino groups in the treating bath. If comparative tests are made with a series of solutions containing the same amount of active chlorine, but containing an increasing amount of amino or imino compounds, it is found that the reaction period necessary for using up the active chlorine increases throughout the series. On comparing the felting properties of the fibrous materials so treated, all of which have absorbed the same amount of active chlorine, it is surprisingly found that the capacity for felting is not reduced to the same extent in all cases. On the contrary it appears that there is an optimum concentration of ammonia or of amino or imino compounds, at which the felting property is reduced to the greatest extent.

In carrying out the process of the invention, therefore, the animal fibres are treated with aqueous solutions of halogens or hypochlorites in the presence of ammonia or the amino or imino compounds in such concentration that substantially the maximum reduction in the felting properties of the fibrous animal substance is achieved. The correct concentration may be easily ascertained by a series of preliminary experiments.

The following examples illustrate the improved process more particularly, it being shown in some of the examples that for each of the various substances added there is an optimum concentration for the desired improvement in the fibres.

Example 1

25 grammes of worsted yarn was treated at room temperature in a solution of the following composition:—

| | |
|---|---|
| Water | cubic cm 750 |
| Sodium hypochlorite lye (13.5% active chlorine) | cubic cm 4 |
| Amino acetic acid | grammes 0.25 |
| Sulphuric acid | do 4 |

It was ascertained by tests on potassium iodide test paper that a period of about an hour and a half was necessary for the chlorine to complete its reaction with the wool.

On repeating the experiment without the addition of amino acetic acid, it was found that after a period of treatment of only 10 minutes there were only traces of active chlorine in the liquor. The reduction effected by the invention in the speed of reaction of the chlorine greatly improves the fibres.

Example 2

Combed material was treated at room temperature in 30 times its weight of a lye bath containing 15% sulphuric acid, 15% chlorine bleaching lye (13.5% active chlorine) and 1% of a 50% solution of commercial lysalbinic acid. After a period of treatment of about one hour the chlorine was used up. The combed material was rinsed and dried in the usual manner. It had a uniform appearance free of patches and a pleasant texture. On repeating the experiment without the addition of the lysalbinic acid, it was found that the chlorine had completed its reaction with the wool within a few minutes. After rinsing and drying, the combed material had brown patches and a somewhat rough texture.

The lysalbinic acid may be replaced by substitution products, which may be obtained on the principle of the well known Schotten Baumann reaction from lysalbinic acid and oleic acid chloride, lauric alcohol chlorocarbonic ester or benzyl chloride. These compounds have good wetting and penetrating capacity which assists in ensuring uniformity in the action of the chlorine.

Example 3

Zephyr yarn was treated as in Example 1 in a solution, which, instead of amino acetic acid contained the same quantity of acetamide. In this case also a considerably better result was obtained than in the usual treating baths containing no additions.

Example 4

25 grammes of zephyr yarn were treated for one hour at room temperature with occasional agitation in a solution of the following composition:—

|  | Grammes |
|---|---|
| Water | 760 |
| 92% sulphuric acid | 2 |
| Active chlorine in the form of sodium hypochlorite | 1 |
| 50% solution of protein degradation products | 0.5 |

The 50% solution of protein degradation products was prepared in known manner by hydrolytic degradation of waste of leather tanned by means of minerals.

After the treatment the zephyr yarn was repeatedly rinsed and dried.

For comparison a further strand of zephyr yarn was chlorinated in the same manner, but without the addition of protein degradation products.

Small test pieces of these two strands of yarn and of the untreated yarn were saturated with a solution containing 3% of soap and 1% of soda, treated on a felting machine for 15 minutes at room temperature, rinsed and dried. Investigation of the test pieces showed that the untreated yarn was very strongly felted; the yarn chlorinated without protein degradation products was slightly felted and that the yarn chlorinated according to the invention was not felted at all. Therefore, the addition of protein degradation products results in increased reduction of the felting property.

Example 5

To ascertain the optimum concentration of sodium lysalbinate for the purpose of the invention the following experiments have been made:

A number of similar strands of wool yarn (zephyr yarn) each weighing 25 grammes were thoroughly wetted and then treated in a series of nine lye baths of the following composition:—

| | |
|---|---|
| Water cubic cm | 1000 |
| Sodium hypochlorite lye (13.5% of active chlorine) cubic cm | 7.4 |
| Sulphuric acid (96%) grammes | 2 |

The first lye bath contained no added substances. The remaining eight contained from 0.1 to 0.8 gramme (rising by steps of 0.1 gramme) of a 50% solution of sodium lysalbinate.

The yarns were treated at room temperature and treatment was continued with occasional agitation, until in each case the whole of the chlorine had been used up, that is until no more than a trace of blue was obtained on testing the solution with potassium iodide paper. The strands of yarn were then thoroughly rinsed and the moisture extracted. They were then saturated with a solution containing 30 grammes per litre of soap and 10 grammes per litre of soda and treated for 15 minutes under similar conditions in a felting machine. They were then thoroughly rinsed and dried. Examination of the test pieces showed that the wool yarn which had been chlorinated in the presence of 0.5 gramme of 50% sodium lysalbinate was felted least. Stronger felting occurs at both higher and lower concentrations of sodium lysalbinate.

Example 6

The following experiments have been made to ascertain the optimum addition of ammonia to the chlorine-containing treating baths:

Batches of 25 grammes of wool yarn were each treated in 1 litre of a solution containing 1 gramme of active chlorine (in the form of sodium hypochlorite) and 2 grammes of sulphuric acid. The first of these solutions contained no additions while the remainder contained from 0.025 to 0.175 gramme of ammonia (rising by steps of 0.025 gramme).

The wool yarns were treated at room temperature until in each case the active chlorine had entered completely into reaction, which occurs quickest in the bath containing no addition and slowest in the bath containing the maximum addition.

After thorough rinsing and extraction of the moisture felting properties of the wool yarns were tested, as described in Example 5. Investigation showed that the batches which had been chlorinated in the presence of 0.050 and 0.075 gramme of ammonia were least felted. Stronger felting occurred in the presence of both higher and lower concentrations of ammonia.

Example 7

The following experiment was made to ascertain the optimum quantity of sodium oleyl-lysalbinate to add to the chlorine-containing baths:

Batches of 25 grammes of wool yarn were treated in forty times their weight of a lye containing 8% of sulphuric acid and 4% of active chlorine (in the form of sodium hyprochlorite). The first solution again contained no addition while the others contained from 0.1 to 0.5 gramme (rising by steps of 0.1 gramme) of a 50% aqueous solution of sodium oleyl-lysalbinate.

The treatment of the yarns and the testing of their felting property was effected as in Example 5.

Investigation of the yarn showed that the batches which were chlorinated with 0.2 and 0.3 gramme per litre of the 50% solution of sodium oleyl-lysalbinate were least felted.

In contrast to the yarns treated in baths containing ammonia (Example 6) the yarns did not show any appreciable yellowing.

Example 8

The following experiments have been made to ascertain the optimum quantity of amino acetic acid to be added to the baths of treatment:—

Batches of 25 grammes of wool yarn were treated as described in the foregoing examples with acid chlorine solutions, but as additions quantities of from 0.1 to 0.6 gramme per litre (increasing by steps of 0.1 gramme) of amino acetic acid were used.

The investigation of the felting properties of the yarns showed that this was least at a concentration of 0.8 gramme per litre of amino acetic acid.

Example 9

Batches of 25 grammes of wool yarn were treated as in Example 8, with the modification that here urea was employed as the added substance.

The wool yarn which had been chlorinated in a solution containing 0.4 gramme per litre or urea showed the least felting capacity.

Example 10

Batches of 25 grammes of wool yarn were treated as in Example 4, except that dicyandiamide was used as the added material for reducing the speed of chlorination.

The felting capacity of the wool yarn was least when the acid chlorine solution contains 0.8 gramme per litre of dicyandiamide.

After having explained the invention in detail, I claim protection, as follows:

1. A method of reducing the felting capacity of wool, comprising the steps of adding a substance selected from the group consisting of ammonia, primary amines, secondary amines, simple and polymeric amino carboxylic acids, imino carboxylic acids, polypeptides, carboxylic acid amides, urethanes, urea and dicyandiamide, to a slightly acidified solution which contains active chlorine of sufficient strength to reduce the felting capacity of the wool, and subjecting the material to be treated to the action of the mixture thus obtained, said substance being added to the solution in concentration sufficient to retard the normal rate of reaction of the chlorine on the wool.

2. A method of reducing the felting capacity of wool, comprising the steps of adding a substance selected from the group consisting of ammonia, primary amines, secondary amines, simple and polymeric amino carboxylic acids, imino carboxylic acids, polypeptides, carboxylic acid amides, urethanes, urea and dicyandiamide, to a slightly acidified solution which contains active chlorine of sufficient strength to reduce the felting capacity of wool, said substances being at least partly substituted by surface active radicals selected from the group containing higher fatty acid residues, fatty alcohol residues and fatty aromatic residues, and subjecting the material to be treated to the action of the mixture thus obtained, said substance being added to the solution in concentration sufficient to retard the normal rate of reaction of the chlorine on the wool.

GEORG WIEGAND.